US009529869B2

(12) United States Patent
Della Corte et al.

(10) Patent No.: US 9,529,869 B2
(45) Date of Patent: *Dec. 27, 2016

(54) CONVERTING TEXT CONTENT TO A SET OF GRAPHICAL ICONS

(71) Applicant: International Business Machines Corporation, Armonk, NY (US)

(72) Inventors: Gianluca Della Corte, Rome (IT); Alessandro Donatelli, Rome (IT); Antonio M. Sgro, Rome (IT)

(73) Assignee: International Business Machines Corporation, Armonk, NY (US)

(*) Notice: Subject to any disclaimer, the term of this patent is extended or adjusted under 35 U.S.C. 154(b) by 98 days.

This patent is subject to a terminal disclaimer.

(21) Appl. No.: 14/487,128

(22) Filed: Sep. 16, 2014

(65) Prior Publication Data

US 2015/0006516 A1    Jan. 1, 2015

Related U.S. Application Data

(63) Continuation of application No. 13/742,779, filed on Jan. 16, 2013.

(51) Int. Cl.
*G06F 17/00* (2006.01)
*G06F 17/30* (2006.01)
*G06F 3/0481* (2013.01)

(52) U.S. Cl.
CPC ..... *G06F 17/30554* (2013.01); *G06F 3/04817* (2013.01); *G06F 17/30011* (2013.01); *G06F 17/30696* (2013.01); *G06F 17/30719* (2013.01)

(58) Field of Classification Search
CPC ... G06F 17/21; G06F 17/211; G06F 17/30896

USPC ................................................. 715/255–256
See application file for complete search history.

(56) References Cited

U.S. PATENT DOCUMENTS

| | | | |
|---|---|---|---|
| 5,479,602 A | 12/1995 | Baecker et al. | |
| 5,870,767 A * | 2/1999 | Kraft, IV | G06F 17/30882 707/E17.013 |
| 6,112,201 A * | 8/2000 | Wical | G06F 17/30572 |
| 6,449,627 B1 * | 9/2002 | Baer | G06F 17/21 707/E17.116 |
| 6,537,325 B1 | 3/2003 | Nishizawa | |
| 6,546,417 B1 | 4/2003 | Baker | |
| 7,231,023 B1 | 6/2007 | Begeja et al. | |
| 7,299,261 B1 | 11/2007 | Oliver et al. | |
| 7,580,568 B1 | 8/2009 | Wang | |

(Continued)

OTHER PUBLICATIONS

Hirakawa et al., An Iconic Programming System, Hi-Visual, IEEE 1990, pp. 1178-1184.*

(Continued)

*Primary Examiner* — Cong-Lac Huynh
(74) *Attorney, Agent, or Firm* — Yee & Associates, P.C.; Richard A. Wilhelm (57) ABSTRACT

A method, system and program product for analyzing textual information and providing a visual representative of a summary of such textual information in the form of a ranked list of icons. A text to icon engine is used that takes as input a textual document. A plurality of icons are each associated to a specific rule such that when the text to icon engine processes textual input, it will apply the rules associated with the icons and return a value that represents how much the text belongs to a specific icon.

3 Claims, 4 Drawing Sheets

(56) References Cited

U.S. PATENT DOCUMENTS

| | | | |
|---|---|---|---|
| 7,607,083 B2 | 10/2009 | Gong et al. | |
| 8,082,277 B1 | 12/2011 | O'Brien et al. | |
| 8,103,726 B2 | 1/2012 | Stoddard et al. | |
| 8,108,398 B2 | 1/2012 | Guday et al. | |
| 8,135,669 B2* | 3/2012 | Olstad | G06F 17/30997 707/608 |
| 8,185,591 B1 | 5/2012 | Lewis | |
| 8,589,494 B2* | 11/2013 | Garrett | G06F 15/16 709/204 |
| 8,656,350 B2* | 2/2014 | Bates | G06F 9/542 715/765 |
| 2002/0078090 A1 | 6/2002 | Hwang et al. | |
| 2002/0099731 A1* | 7/2002 | Abajian | G06F 17/3002 715/202 |
| 2003/0107736 A1 | 6/2003 | Fujimoto | |
| 2005/0036712 A1 | 2/2005 | Wada | |
| 2005/0071759 A1* | 3/2005 | Connors | G06Q 10/10 715/255 |
| 2005/0267761 A1 | 12/2005 | Ueno | |
| 2006/0109800 A1* | 5/2006 | Vaillant | H04L 41/0803 370/254 |
| 2006/0200530 A1 | 9/2006 | Tokdua | |
| 2007/0083540 A1 | 4/2007 | Gundla et al. | |
| 2008/0097985 A1* | 4/2008 | Olstad | G06F 17/30997 |
| 2008/0216022 A1 | 9/2008 | Lorch | |
| 2008/0244453 A1 | 10/2008 | Cafer | |
| 2009/0006369 A1 | 1/2009 | Guday et al. | |
| 2009/0012984 A1 | 1/2009 | Ravid | |
| 2009/0049140 A1 | 2/2009 | Stoddard et al. | |
| 2009/0055186 A1* | 2/2009 | Lance | G10L 13/033 704/260 |
| 2009/0089382 A1* | 4/2009 | Garrett | H04L 51/14 709/206 |
| 2009/0248400 A1 | 10/2009 | Luke | |
| 2009/0259995 A1* | 10/2009 | Inmon | G06F 17/2264 717/131 |
| 2009/0276732 A1* | 11/2009 | Dervan | G06Q 10/107 715/853 |
| 2010/0005065 A1 | 1/2010 | Lai | |
| 2010/0122193 A1 | 5/2010 | Lange et al. | |
| 2010/0150449 A1* | 6/2010 | Laksono | H04N 21/4345 382/190 |
| 2010/0205545 A1* | 8/2010 | Dawson | G06Q 10/107 715/758 |
| 2010/0306357 A1 | 12/2010 | Chen | |
| 2011/0028825 A1* | 2/2011 | Douglas | G06F 19/321 600/407 |
| 2011/0066692 A1 | 3/2011 | Ciancio-Bunch et al. | |
| 2011/0145064 A1* | 6/2011 | Anderson | G06Q 30/02 705/14.53 |
| 2011/0269435 A1 | 11/2011 | Dieckman | |
| 2012/0076414 A1 | 3/2012 | Xu et al. | |
| 2012/0117161 A1 | 5/2012 | Best | |
| 2012/0173487 A1* | 7/2012 | Gupta | G06F 17/30719 707/634 |
| 2012/0232947 A1* | 9/2012 | McLachlan | G06Q 10/06 705/7.23 |
| 2012/0293528 A1 | 11/2012 | Larsen | |
| 2012/0331079 A1* | 12/2012 | Brown | G06Q 10/107 709/206 |
| 2013/0159432 A1 | 6/2013 | Deering et al. | |
| 2013/0231144 A1 | 9/2013 | Daniel | |
| 2013/0266193 A1 | 10/2013 | Tiwari et al. | |
| 2013/0335627 A1 | 12/2013 | Larsson | |
| 2014/0039877 A1* | 2/2014 | Guenigault | G06F 17/21 704/9 |
| 2014/0059468 A1* | 2/2014 | Allgair | G06F 3/04842 715/771 |
| 2014/0201613 A1 | 7/2014 | Della Corte et al. | |
| 2015/0201021 A1* | 7/2015 | Beck | G06F 17/2765 709/201 |
| 2015/0286383 A1* | 10/2015 | D'Aloisio | G06F 3/04842 715/748 |

OTHER PUBLICATIONS

Moriconi et al., Visualizing Program Designs through PegaSys, IEEE 1985, pp. 72-85.*

Keogh et al., Intelligent Icons: Integrating Lite-Weight Data Mining and Visualization into GUI Operating Systems, IEEE 2006, pp. 1-5.*

"Personalized Email Summary to Mobile," Amika Mobile, copyright 2013, 2 pages. Accessed Feb. 18, 2013, http://www.amikamobile.com/personalized_email_summary_to_mobile.asp.

Nowell, "Graphical Encoding for Information Visualization: Using Icon Color, Shape, and Size to Convey Nominal and Quantitative Data," Dissertation, Virginia Polytechnic Institute, Nov. 1997, 84 pages.

Scerri et al., "The Path Towards Semantic Email: Summary and Outlook," Proceedings of the Enhanced Messaging Workshop, Jul. 2008, pp. 64-70.

Office Action, dated Mar. 19, 2015, regarding U.S. Appl. No. 13/742,779, 27 pages.

Final Office Action, dated Aug. 14, 2015, regarding U.S. Appl. No. 13/742,779, 28 pages.

Office Action, dated Dec. 31, 2015, regarding U.S. Appl. No. 13/742,779, 6 pages.

* cited by examiner

| ☑ Who | △ Subject | Date | Size ● |
|---|---|---|---|
| ▼ High Importance | | | |
| ! ☑ Antonio Sgro' | pizza il 5 con David hoffman | 10/03/2011 09:35 AM | 2K ○ |
| ! ☑ Antonio Sgro' | Fw: need to confirm/deny that these platforms/versions are not supported by ITM | 09/21/2011 09:46 AM | 32K ○ |
| ! Marjean Fieldhouse | Citi has question on 84710,7TD,000 / APAR IV03416 | 09/16/2011 08:49 PM | 2K ● |
| ! ☑ PAOLO BARATTI | Re: Fw: 15452 - EPIC- Configuration Enhancements | 09/16/2011 03:29 PM | 43K ○ |
| ! ☑ Stefania Cannone | You answered "Yes" to this reval letter for "TDWA 2008 Project Repository" | 09/14/2011 02:37 PM | 108K ● |
| ! Cindy Jiovani | PM30G class starting next week, Sept 19 | 09/12/2011 07:43 PM | 9K ○ |
| ! ☑ Vadmin | Applied Project Management in an IPD Environment (PM30G) Starting 9/19/2011. Live | 08/02/2011 04:28 PM | 107K ● |
| ▼ Calendar Events | | | |
| ◇ Francesca Fenati | Rescheduled: Rome Patent Board (29 Sep 10:00 CEDT in VDC B4-218) | 09/28/2011 10:56 AM | 2K ○ |
| ▼ Normal | | | |
| ☑ Antonio Sgro' | ☺ Re: Fw: 47170,122,000 | 10/03/2011 10:38 PM | 67K ○ |
| ○ Leonida Gianfagna | Re: Fw: 47170,122,000 | | 68K ○ |
| ☑ Luigi Massa | Fw: 47170,122,000 | | 66K ○ |
| IBM Club | Updates from the IBM Club | | 2K ● |
| ☑ Antonio Sgro' | Re: pizza il 5 con David hoffman | | 7K ○ |

┌─────────────────────────────────────────────┐
│ To: Luigi Massa/Italy/IBM@IBMIT, │
│ Cc: Gianluca Della Corte/Italy/IBM@IBMIT. Leonida Gianfagna │
│ Bcc: │
│ Subject: Re: Fw: 47170,122,000 │
│ From: ☐ Antonio Sgro/Italy/IBM - Monday 10/03/2011 10:38 AM │
│ │
│ Thanks for your help. │
│ Antonio │
│ > Dean Okamura    Tom, I think that you can fixup the SIGTERM mask │
│ > Tom Hemp        Hi Dean, I have a PMR for Mastercard and they ha │
│ > Antonio Sgro'   Hi Tom thanks... so please forward this pmr to OS │
│ > Tom Hemp        Antonio, I own Level 3 for KT1 now and have been │
│ > Antonio Sgro'   this is TEMA and especially it is KT1... copied La │
└─────────────────────────────────────────────┘ ~514

CONVERTING TEXT CONTENT TO A SET OF GRAPHICAL ICONS

CROSS-REFERENCE TO RELATED APPLICATION(S)

This application is a continuation of and claims the benefit of priority to U.S. patent application Ser. No. 13/742,779, filed Jan. 16, 2013, entitled "Converting Text Content to a Set of Graphical Icons," the contents of which are incorporated herein by reference.

BACKGROUND

1. Field

The disclosure relates generally to a technique for analyzing and summarizing textual information, and more specifically to depicting a meaning of a textual document in graphical form.

2. Description of the Related Art

Textual documents can be long and complex. Similarly, an email message chain, whereby an initial email is responded to (by email recipient(s)) one or more times and such responses are all included with the original email, can be long and complex. A user may have to analyze/review this email message chain to ascertain/determine response information such a simple 'yes' response that was made by a given email recipient.

As described in US Patent Publication 2009/0049140, attempts have been made to analyze email content to determine potential intended recipients. Other document analysis techniques involve visually summarizing documents using images which are a visual representative of the documents for which the images represent, where an external image is obtained from an external source using key phrases from the document.

There exists a need to provide a more robust technique for analyzing and summarizing textual information such as may be found in one or more documents.

SUMMARY

According to one embodiment of the present invention, a method, system and program product are provided for analyzing textual information and providing a visual representative of a summary of such textual information in the form of a ranked list of icons. A text to icon engine is used that takes as input a textual document. A plurality of icons are each associated to a specific rule such that when the text to icon engine processes textual input, it will apply the rules associated with the icons and return a value that represents how much the text belongs to a specific icon.

BRIEF DESCRIPTION OF THE SEVERAL VIEWS OF THE DRAWINGS

FIG. 5 is a representative user interface/display that results from the text to icon conversion process/system.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
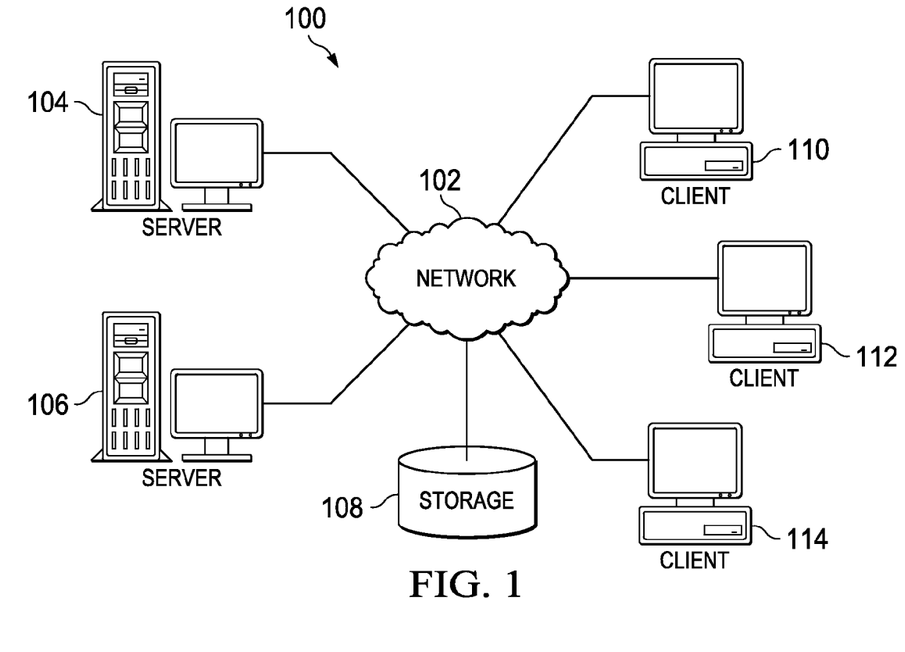
FIG. 1 is an illustrative diagram of a data processing environment in which illustrative embodiments may be implemented.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

In this depicted example, client computers 110, 112, and 114 may send and receive email messages via at least one of server computer 104 and server computer 106. One or more of the different illustrative embodiments may be implemented in network data processing system 100 to manage the delivery of email messages.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example and not as an architectural limitation for the different illustrative embodiments.

Figure 2:
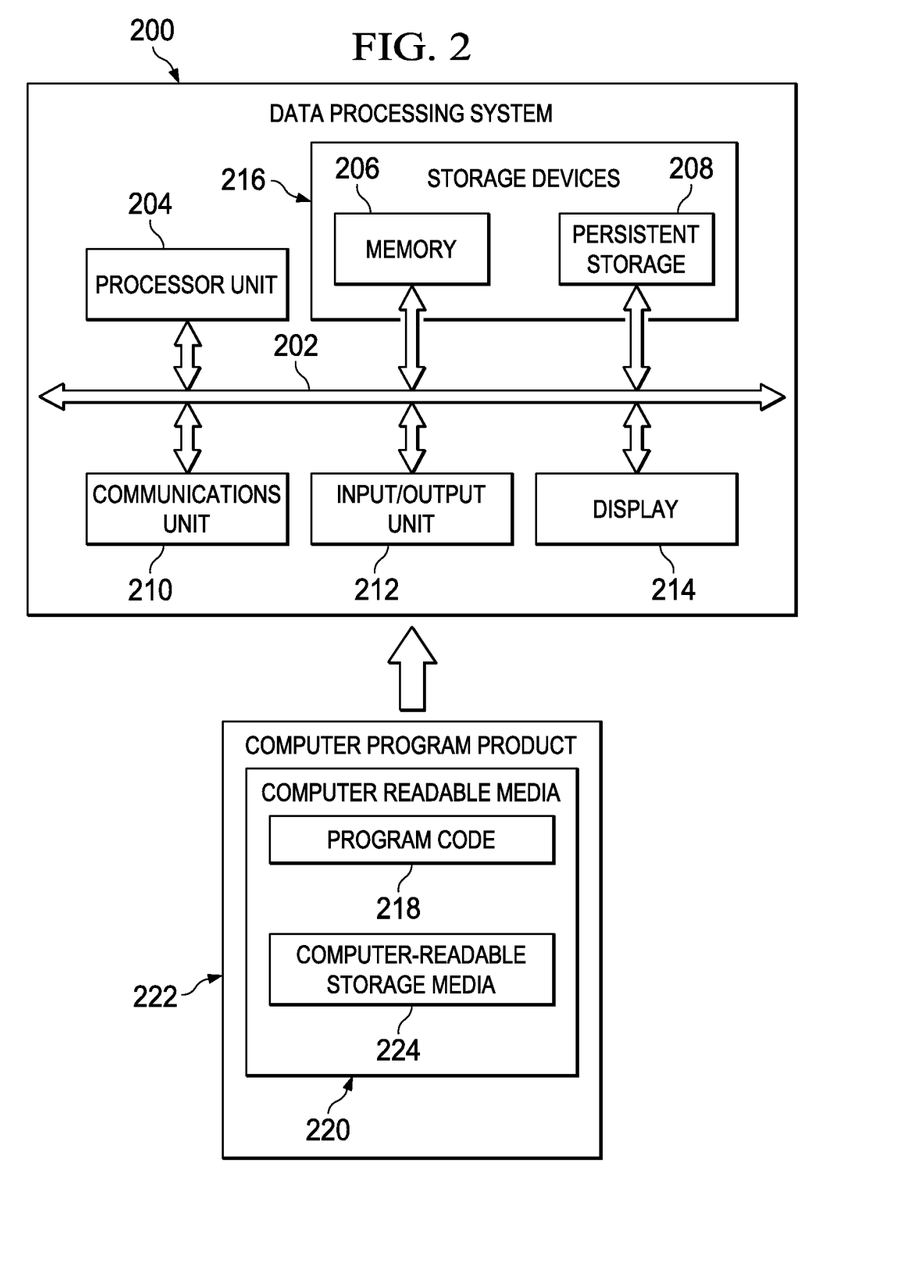
FIG. 2 is an illustration of a data processing system in accordance with an illustrative embodiment.

Turning now to FIG. 2, an illustration of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214. Data processing system 200 may be used to implement computers, such as server computer 106 and client computer 110 in FIG. 1. Additionally, data processing system 200 may be used to implement other types of devices, such as notebook computers, desktop computers, mobile phones, and other suitable types of devices.

Processor unit 204 serves to process instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information, either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and/or wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for processing by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto, or transferred to, data processing system 200 for processing by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these examples, computer readable storage media 224 is a physical or tangible storage device used to store program code 218, rather than a medium that propagates or transmits program code 218. Computer readable storage media 224 is also referred to as a computer readable tangible storage device or a computer readable physical storage device. In other words, computer readable storage media 224 is a media that can be touched by a person.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server to data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide physical or architectural limitations to the manner in which different embodiments may be implemented. The different illustrative embodiments may be implemented in a data processing system including components in addition to or in place of those illustrated for data processing system 200. Other components shown in FIG. 2 may be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit with circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 206, or a cache, such as found in an interface and memory controller hub that may be present in communications fabric 202.

According to one embodiment of the present invention, a method, system and program product are provided for analyzing textual information and providing a visual representative of a summary of such textual information in the form of a ranked list of icons. A text to icon engine is used that takes as input a textual document. A plurality of icons are each associated to a specific rule such that when the text to icon engine processes textual input, it will apply the rules associated with the icons and return a value that represents how much the text belongs to a specific icon.

Figure 3:
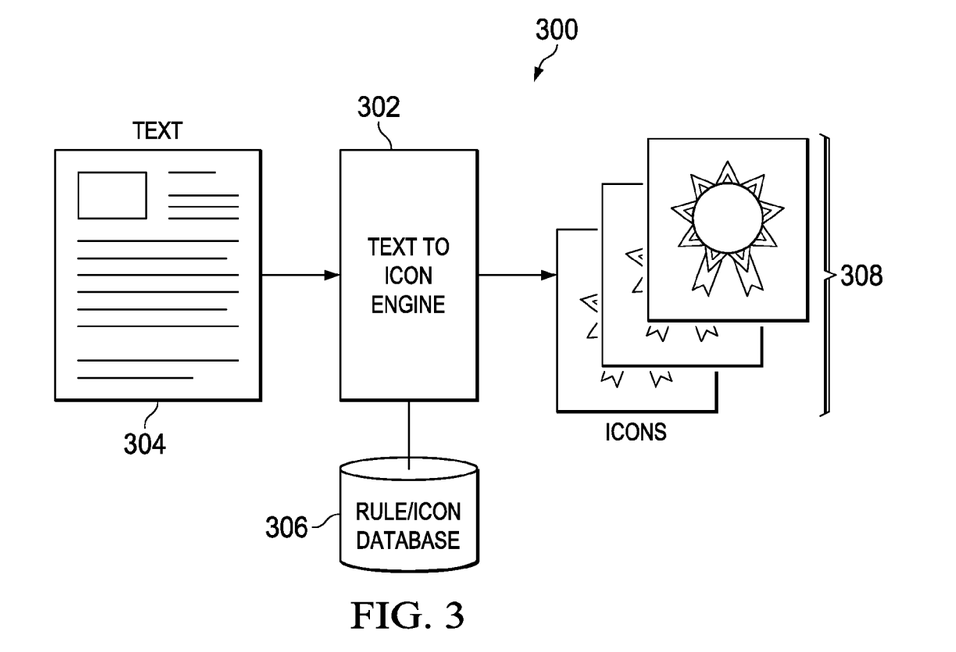
FIG. 3 is a diagram illustrating a text to icon conversion system in accordance with an illustrative embodiment.

Turning now to FIG. 3, there is depicted at 300 a text to icon conversion system according to a preferred embodiment of the present invention. A text to icon engine 302 is used, and receives as input the textual information 304, such as a document, email message or email string(s). The text-to-icon engine 302 analyzes the textual content/information 304 and generates a summary description of the information, in the form of a set of one or more images/icons 308, using functional rule/icon database 306. In a preferred embodiment, each icon 308 is associated with a specific rule in the rule/icon database 306. As the text to icon engine 302 analyzes incoming text from textual information 304, it applies the rules associated with the icons and determines an integer value that represents how much the text belongs to a specific icon, with such integer value also called a matching index, as further described hereinbelow. At the end of the analysis, after processing each of the rules in the rule/icon database 306, after the engine 302 generates a set of matching indexes for the textual information, each matching index is compared with a customizable threshold value. If a given matching index exceeds (or in an alternative embodiment(s), exceeds or equals; or in another alternative embodiment, is less than) the customizable threshold value, the icon/image corresponding to such matching index is assigned to the textual information/document 304, as further described hereinbelow.

Figure 4:
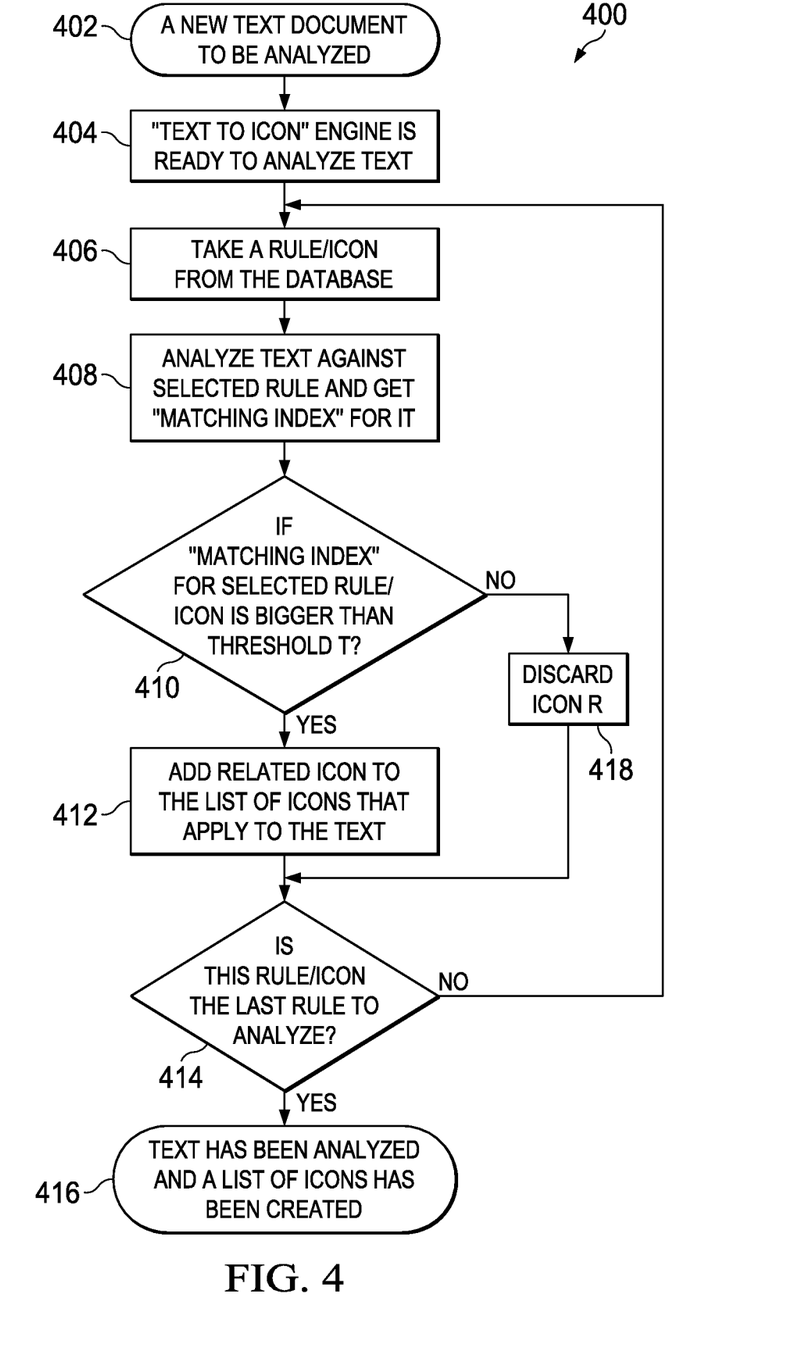
FIG. 4 is a diagram illustrating a process flow of a text to icon conversion process.

Turning now to FIG. 4, there is depicted, such as is depicted by element 304 of FIG. 3, d at 400 a more detailed implementation of the text-to-icon summary process. A new text document to be analyzed, such as is depicted by element 304 of FIG. 3, is provided at 402. The text-to-icon engine, such as is depicted by element 302 of FIG. 3, is made ready or initialized at 404. A given rule is selected/retrieved from a rule/icon database, such as is depicted by element 306 of FIG. 3, at 406. Text from text/document file 304 (as depicted in FIG. 3) is analyzed to determine a matching index at 410. The text/document file is analyzed using traditional pattern matching rules that are used to perform text mining, as exemplified by IBM InfoSphere (and other known natural language processing techniques including both manual coding of language rules and machine learning of statistical patterns such as is provided by IBM Watson and/or relationship extraction/sentiment analysis techniques), according to Value_i=Rule_i (text document). At step 410, a determination is made as to whether the matching index that was determined at step 408 exceeds a threshold. If not, the icon associated with the given rule is not included in a resulting list at 418. If, instead, it is determined at 410 that the matching index does exceed the threshold, the icon associated with the given rule is included in a resulting list of icons associated with the textual information/document 304 at 412. Next, at step 414, a determination is made as to whether any more unprocessed rules in rule/icon database 306 (as depicted in FIG. 3) remain to be processed at 414. If so, processing returns to step 406 to process another rule from the rule/icon database 306 (as depicted in FIG. 3). If this is instead the last rule to analyze, processing proceeds to 416 where the created list of icons/images that pertain to the textual information/document 304 (as depicted in FIG. 3) is now available for use, such as presenting such information to a user. In a preferred embodiment, the list is maintained/created in a sorted order, with the icon having an associated matching index with the highest value being placed at the top of the list, and subsequent icons that exceed the threshold are placed in the list in a ranked descending order according to their respective matching indices. Alternatively, the ranked list could be ordered from lowest to highest, which may be preferred in the alternative embodiment where matching indexes that are less than the (configurable) threshold are deemed to be associated with text in the textual document/email.

FIG. 5 illustrates a resulting display screen at 500. Here, a particular user's email inbox or folder is depicted at 510, including a set of 'high importance' emails, followed by an email pertaining to a 'calendar event', and finally a set of 'normal' emails in the user's inbox/folder are depicted at inbox/folder 510. A particular email that has been processed by the text to icon/image engine in order to determine an appropriate icon or set of icons that summarizes the textual content is shown at 514. The resulting icon that summarizes such textual content—here a 'happy face' icon—is depicted at the tail end of arrow 512, and is adjacent to the sender's name of Antonio Sgro' who sent the reply email 514 and summarizes the textual string of 'Thanks for your help' that is included in such email response.

The following is a representative, non-exhaustive list of summary images/icons that may be generated as a result of the above described text to icon/image summarization process pertaining to analysis of text/document/email information:

Happy Smile icon: it is a thanks message;

Question Mark icon: it means the text/document/email contains one or more questions;

Positive Acknowledgement icon: it means that a user is providing a confirmation message;

Negative Acknowledgement icon: it means that a user is providing a negative message;

Short Document icon: it means the text/document/email has short text content;

Long Document icon: it means the text/document/email has long text content; and

Technical Document icon: it means the text/document/email is a document with technical details.

Thus, illustrative embodiments of the present invention provide a computer implemented method, computer system, and computer program product for analyzing textual information and providing a visual representative of a summary of such textual information in the form of a ranked list of icons.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method implemented by a computer to provide a graphical summary of textual data, comprising steps implemented by the computer of:

analyzing the textual data using a plurality of rules that each specifies textual characteristics for various types of the textual data and an associated icon;

selecting at least one of the plurality of rules whose specified textual characteristics match characteristics of the textual data to form selected rules; and generating a list of at least one icon according to the selected rules, wherein analyzing the textual data comprises:

forming matching indices by determining a matching index value for each rule of the plurality of rules that represents how much the textual data belongs to a specific icon of a plurality of icons.

2. The method according to claim 1, wherein the list comprises a plurality of icons.

3. The method according to claim 2, wherein the plurality of icons are ordered in the list according to the matching indices.

* * * * *